(12) United States Patent
Chou et al.

(10) Patent No.: US 7,375,729 B2
(45) Date of Patent: May 20, 2008

(54) ANIMATION DISPLAY APPARATUS AND METHOD

(75) Inventors: Yu-Zuong Chou, Taipei (TW);
Zou-Ping Chen, Taichung (TW);
Tsung-Chi Lin, Taipei (TW);
Cheng-Shun Liao, Puyan Township, Changhua County (TW)

(73) Assignee: Realtek Semiconductor Corp., Hsinchu (TW)

( * ) Notice: Subject to any disclaimer, the term of this patent is extended or adjusted under 35 U.S.C. 154(b) by 231 days.

(21) Appl. No.: 11/122,993

(22) Filed: May 5, 2005

(65) Prior Publication Data
US 2005/0248575 A1    Nov. 10, 2005

(30) Foreign Application Priority Data
May 7, 2004    (TW) .............................. 93112981 A

(51) Int. Cl.
*G06T 13/00*    (2006.01)

(52) U.S. Cl. ...................... 345/473; 345/656; 345/589; 345/591; 345/649

(58) Field of Classification Search ................ 345/473, 345/656, 589, 591, 649
See application file for complete search history.

(56) References Cited

U.S. PATENT DOCUMENTS

| 5,227,863 A | * | 7/1993 | Bilbrey et al. ............... 348/578 |
| 5,861,893 A | * | 1/1999 | Sturgess ..................... 345/562 |
| 6,252,604 B1 | | 6/2001 | Snyder et al. |

OTHER PUBLICATIONS

Richard G. Shoup, Color table animation, ACM SIGGRAPH Computer Graphics, v.13 n.2, p. 8-13, Aug. 1979.*

* cited by examiner

*Primary Examiner*—Kimbinh T. Nguyen
(74) *Attorney, Agent, or Firm*—Thomas, Kayden, Horstemeyer & Risley

(57) ABSTRACT

An animation display device, which is a dedicated hardware circuit implemented in an integrated circuit, includes a control register for storing a plurality of control bits, an image memory for storing image data, and a processing unit coupled to the control register and the image data. The processing unit reads the image data stored in the image memory according to the control bits so as to generate an animation effect. The animation display device generates the animation effect frame by frame.

20 Claims, 5 Drawing Sheets

ANIMATION DISPLAY APPARATUS AND METHOD

This application claims the benefit of Taiwan application Serial No. 93112981, filed May 7, 2004, the content of which is incorporated herein by reference.

BACKGROUND OF THE INVENTION

1. Field of the Invention

The invention relates in general to the animation display apparatus and the animation display method, and more particularly to the animation display apparatus and method for implementing the animation effect using a dedicated hardware circuit.

2. Description of the Related Art

Recently, in the applications of electronic products including personal computers and information appliances (e.g., digital televisions), especially in those applications requiring user interfaces, the displays thereof are usually configured to perform the function of displaying images such as a function menu or operations of a cursor. Thus, the requirement of generating animation effects, such as cursor animation or dynamic menu effects, has been induced. In general, the animation effect is achieved by sequentially displaying a series of images, which have small differences therebetween, taking the advantage of the persistence of vision phenomenon of human eyes.

Generally speaking, the animation effect presented in the displayed frames is achieved using software program codes in conjunction with a processor. However, using software to implement the animation effect of display has the drawback of increasing the processor loading and consuming memory space of the display apparatus. In addition, the processing is executed according to the internal operating clock (also referred to as operating by time) when the processor generates the animation effect according to the software program code. However, when the animation is outputted to the display as frames, the transmission and displaying is performed on a frame-by-frame basis (also referred to as operating by frame). Consequently, the animation effect of the "operating by time" causes difficulty when displaying by frames.

SUMMARY OF THE INVENTION

It is therefore an object of the invention to provide an animation display apparatus and an animation display method for implementing an animation effect using a dedicated hardware circuit, wherein the apparatus and method have the function of generating the animation effect in a manner of operating by frame.

The invention achieves the above-identified object by providing an animation display apparatus being a dedicated hardware circuit implemented in an integrated circuit. The animation display apparatus includes a control register for storing a plurality of control bits, an image memory for storing image data, and a processing unit, which is coupled to the control register and the image data, for reading the image data stored in the image memory according to the control bits and generating an animation effect. The animation display apparatus generates the animation effect on a frame-by-frame basis.

The invention also achieves the above-identified object by providing an animation display method being used in a dedicated hardware circuit implemented in an integrated circuit. The method includes the steps of storing a plurality of control bits in a control register, storing image data in an image memory, and reading the image data stored in the image memory according to the control bits and generating an animation effect on a frame-by-frame basis.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
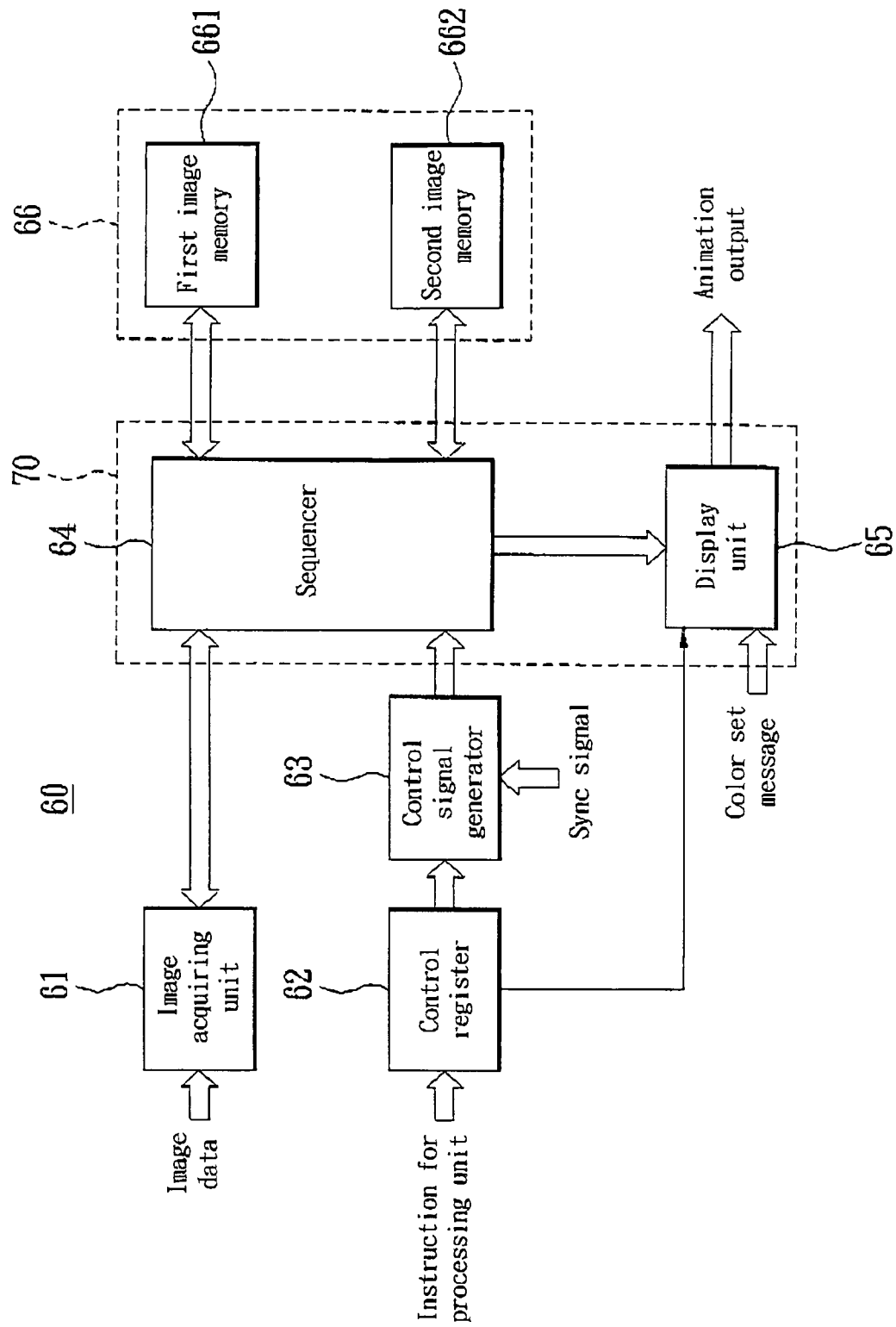
FIG. 1 shows the architecture of an animation display apparatus according to an embodiment of the invention.

FIG. 1 shows the architecture of an animation display apparatus according to an embodiment of the invention. In this embodiment, an animation display apparatus 60 includes an image acquiring unit 61, a control register 62, a control signal generator 63, a processing unit 70 including a sequencer 64 and a CLUT (Color Look-Up-Table) display unit 65, and an image memory 66 including a first image memory 661 and a second image memory 662. The animation display apparatus 60 of this embodiment is a dedicated hardware circuit, such as an application-specific integrated circuit (i.e., ASIC), which may be implemented using an integrated circuit chip, for generating an animation effect required in products such as personal computers or information home appliances.

The images, such as the images of the mouse cursor (an arrowhead is used as an example), utilized by the animation display device 60 to generate the animation effect may be loaded from another storage apparatus, such as a DRAM, via the image acquiring unit 61 and then stored in the image memory 66. The control register 62 can load, from a central processing unit of the system, and store the instructions for controlling the animation display apparatus 60. The control signal generator 63 generates control signals required by the processing unit according to various instruction entries stored in the control register 62. The sequencer 64 reads the images stored in the image memory 66 in different sequences according to the control signals transferred from the control signal generator 63 so as to produce the specific animation effects. Finally, the CLUT display unit 65 can load a plurality of CLUT sets (hereinafter referred to as color sets), each of which includes a plurality of color entries respectively corresponding to different portions of the image. The values of the color entries may be defined by the user. The CLUT display unit 65 colors the images read and transferred by the sequencer from the image memory 66 according to the content of the color set and then outputs the colored images. More particularly, the CLUT display unit 65 can automatically switch between the used color sets according to the value of a specific entry of the control register 62 so as to produce different animation effects. The images outputted from the animation display apparatus 60 are further blended with other video frames and then displayed on the display.

It is to be noted that the control signal generator 63 of this embodiment generates the control signal to control to processing unit 70 to generate the animation effect according to a sync signal associated to the to-be-blended video frame (some well known sync signals are the horizontal sync signal HSYNC and the vertical sync signal VSYNC). Therefore, the animation display apparatus 60 generates the animation effect in a manner of operating by frame so as to facilitate the display operation.

Figure 2A:
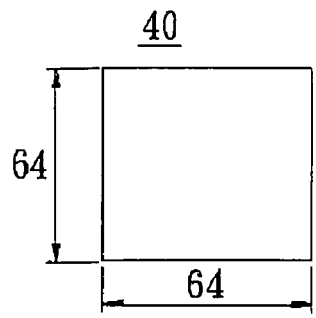
FIGS. 2A to 2C are schematic illustrations showing arrangements of an image memory.
Figure 2B:
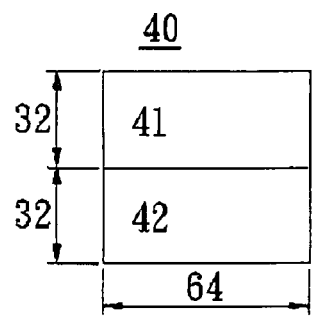
Figure 2C:
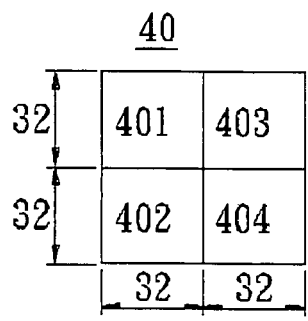

In this embodiment, the image memory 66 can have different arrangements according to the size of the used image. For example, if the first and second image memories 661 and 662 of the image memory 66 have the image storage spaces of 64 pixels×32 pixels (i.e., the total image storage space is 64 pixels×64 pixels), then one, two and four images, as shown in the image memory arrangements of FIGS. 2A, 2B and 2C, may be loaded according to the used different image sizes including the 64 pixels×64 pixels, the 64 pixels× 32 pixels and 32 pixels×32 pixels, respectively.

Figure 3:
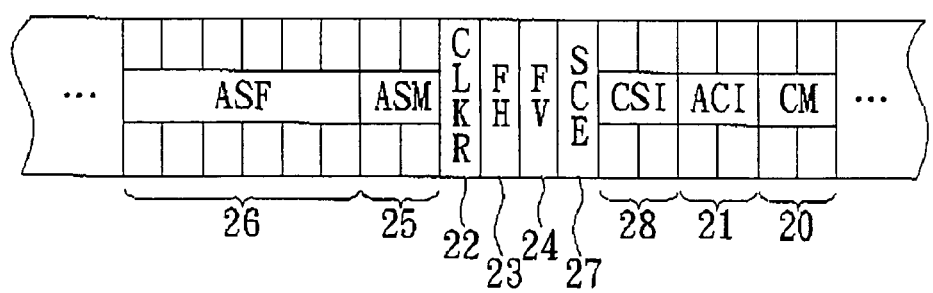
FIG. 3 is a schematic illustration showing a register used in the embodiment of the invention.

FIG. 3 is a schematic illustration showing the entries of the control register 62 in an embodiment of the invention. Please note that the entry allocation of FIG. 3 shows an illustrative but non-limiting example. In this embodiment, the control register 62 includes the entries of cursor mode (CM) bits 20, active cursor index (ACI) bits 21, a clockwise rotation (CLKR) bit 22, a flip horizontal (FH) bit 23, a flip vertical (FV) bit 24, auto-showing model (ASM) bits 25, auto-showing frequency (ASF) bits 26, a color look-up-table enable (show CLUT enable, SCE) bit 27, and color set index (CSI) bits 28.

The CM bits 20 determine a mode of the images stored in the image memory 66 and used for generating the animation effect. In this embodiment, two bits are allocated to represent the images stored are of the size of 64 pixels×64 pixels, 64 pixels×32 pixels, 32 pixels×64 pixels, or 32 pixels×32 pixels.

The ACI bits 21 determine an index value for the images stored in the image memory 66 and used to generate the animation effect. For example, if the CM bits 20 indicate that the mode for the images stored in the image memory 66 is 32 pixels×32 pixels, the ACI bit 21 can decide to use either one of the four stored images to generate the animation effect.

The CLKR bit 22 determines whether or not the image is to be rotated 90 degrees clockwise to generate the animation effect. In this embodiment, the CLKR bit 22 having a value of 1 indicates that the image is to be rotated 90 degrees clockwise, and the CLKR bit 22 having a value of 0 indicates that the image is to be rotated.

The FH bit 23 determines whether or not the image is to be horizontally flipped about a vertical axis to generate the animation effect. In this embodiment, the FH bit 23 having a value of 1 indicates that the image is to be flipped horizontally, and the FH bit 23 having a value of 0 indicates that the image is not to be flipped horizontally.

The FV bit 24 determines whether or not the image is to be vertically flipped about a horizontal axis to generate the animation effect. In this embodiment, the FV bit 24 having a value of 1 indicates that the image is to be flipped vertically, and the FV bit 24 having a value of 0 indicates that the image is not to be flipped vertically.

The ASM bits 25 determine whether the animation display apparatus 60 accepts the control of the instruction of the central processing unit to generate the animation effect, or generates the animation effect by itself and when doing so, indicate the mode of the self-generated animation effect.

The ASF bits 26 determine the display frequency for the animation effect in the auto-showing model according to a plurality of bits.

The SCE bit 27 determines whether or not the animation display apparatus 60 generates the animation effect by automatically switching among color sets.

The color set index bits 28 determine the index value to be added to the color set of the image.

The operations of the animation display device 60 according to the embodiment of the invention will be described in detail. According to the value stored in the ASM bits 25, the operations for the animation display apparatus may be classified into a user configured animation mode, an animating-by-buffer mode, a clockwise rotation animation mode, and a counterclockwise rotation animation mode, wherein the letter three modes are of the auto-showing model.

Figure 4A:
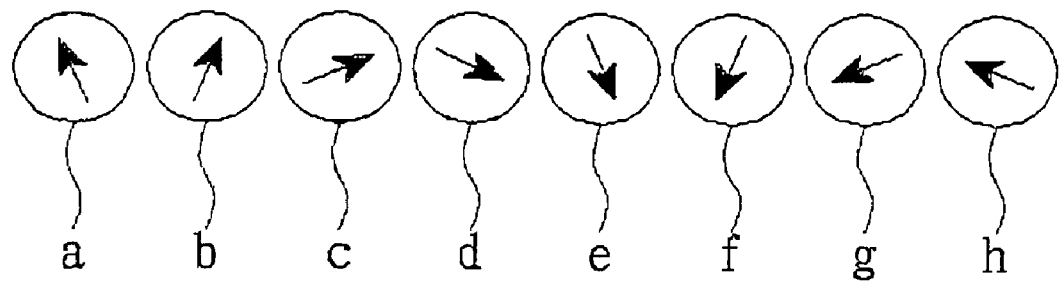
FIG. 4A shows clockwise rotation steps for an image.

In the user configured animation mode, the control signal generator 63 reads out information of the entries such as the CM bit 20, ACI bit 21, CLKR bit 22, FH bit 23 and FV bit 24 from the control register 62, generates the control signal according to the information of the entries, and thus controls the sequencer 64 to read the images, which are stored in the image memory 66 and indexed by the ACI bits 21, according to various sequences. Please refer to FIG. 4A. It is assumed that the arrowhead a tilting leftwards in FIG. 4A is the original image stored in the image memory 66. If the to-be-outputted image is shown as arrowhead a, the combination (CLKR, FH, FV) of the entries of the CLKR bit 22, the FH bit 23 and the FV bit 24 is set as (0, 0, 0). If the to-be-outputted image is shown as arrowhead b, (CLKR, FH, FV) is set to be (0, 1, 0) because the arrowhead b is formed by horizontally flipping the arrow a. By doing so, the eight output images with different directions can be represented according to the combinations of different values of (CLKR, FH, FV). As shown in FIG. 4A, arrowheads a, b, c, d, e, f, g, and h respectively correspond to the combinations of the values of (0, 0, 0), (0, 1, 0), (1, 0, 0), (1, 0, 1), (0, 1, 1), (0, 0, 1), (1, 1, 1) and (1, 1, 0). The sequencer 64 can read pixels of the images stored in the image memory 66 in different sequences according to various combinations of values of the three entries so as to generate output images with different directions. The way of generating the output images with different directions according to the sequences of reading the pixels is well known in the art, and detailed descriptions thereof will be omitted. Next, the CLUT display unit 65 determines the color set index to be used according to the value of the color set index bits 28 so as to color the output image generated by the sequencer.

In the animating-by-buffer mode, the control signal generator 63 reads the information of the entries of the CM bits 20 and the ASF bits 26 from the control register 62, and generates the control signal to control the sequencer 64 to read the images stored in the image memory 66 according to the information of the entries. In this mode, the control signal generator 63 directs the sequencer 64 to sequentially read various images stored in the image memory 66 so as to generate the animation effect. It is assumed that the image memory stores four images of 32 pixels×32 pixels. In this mode, the sequencer 64 sequentially reads the four images to generate the animation effect. The CLUT display unit 65 can also color the image, as mentioned hereinabove.

In the clockwise rotation animation mode, the control signal generator 63 reads the information of the entries of the CM bits 20, the ACI bits 21 and the ASF bits 26 from the control register 62, and generates the control signal, according to the information of the entries, to control the sequencer 64 to read the images stored in the image memory 66. In this mode, the control signal generator 63 directs the sequencer 64 to generate the output images sequentially according to the sequence of a→b→c→d→e→f→g→h, as shown in FIG. 4A, so as to generate the animation effect of the clockwise rotation. The CLUT display unit 65 can also color the images, as mentioned hereinabove.

Figure 4B:
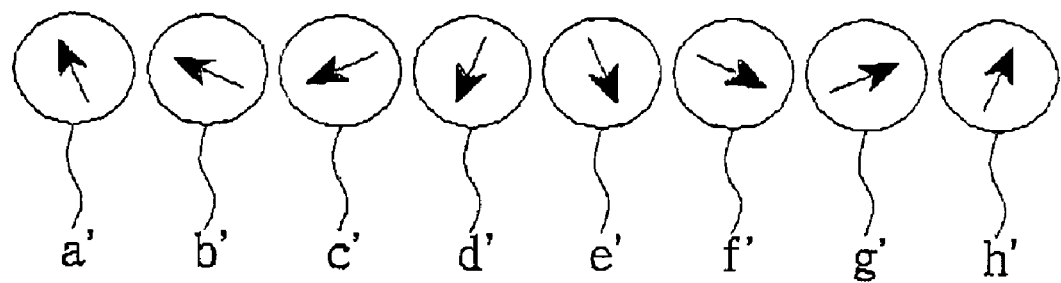
FIG. 4B shows counterclockwise rotation steps for an image.

In the counterclockwise rotation animation mode, the control signal generator 63 reads the information of the entries of the CM bits 20, the ACI bits 21 and the ASF bits 26 from the control register 62, and generates the control signal, according to the information of the entries, to control the sequencer 64 to read the images stored in the image memory 66. In this mode, the control signal generator 63 directs the sequencer 64 to generate the output images sequentially according to the sequence of a'→b'→c'→d'→e'→f'→g'→h', as shown in FIG. 4B, so as to generate the animation effect of the counterclockwise rotation. The CLUT display unit 65 can also color the images, as mentioned hereinabove.

Figure 5A:
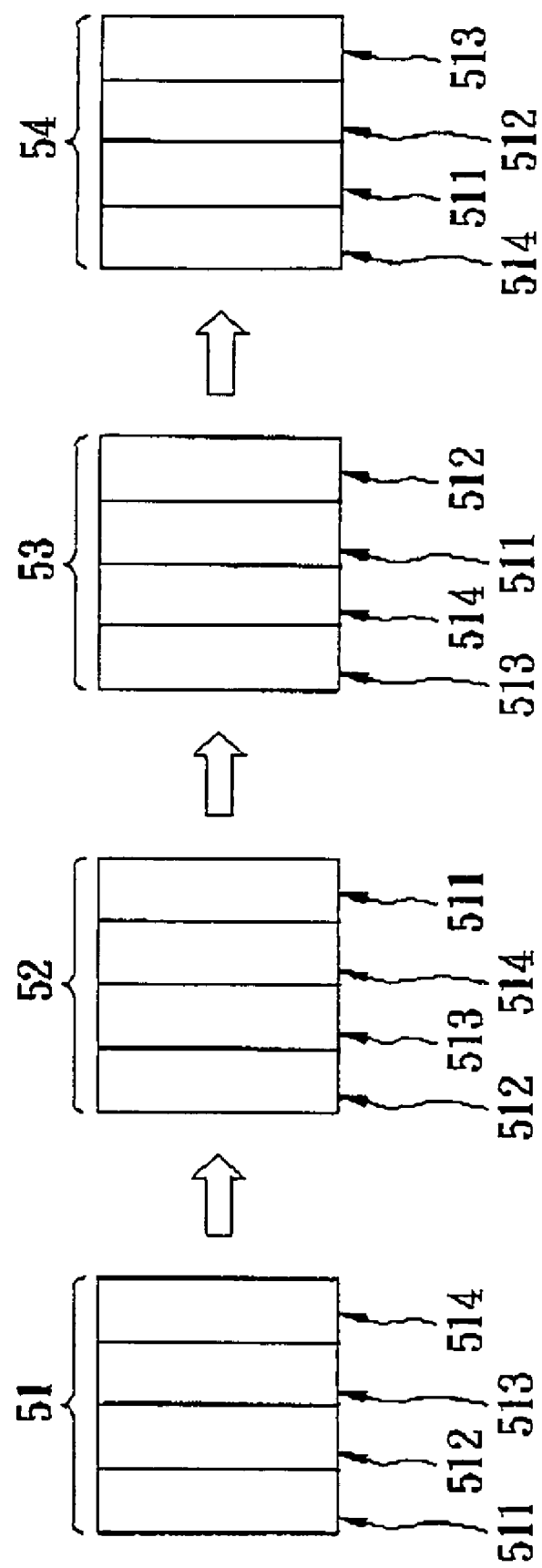
FIG. 5A is a schematic illustration showing sequence displays among color sets.
Figure 5B:
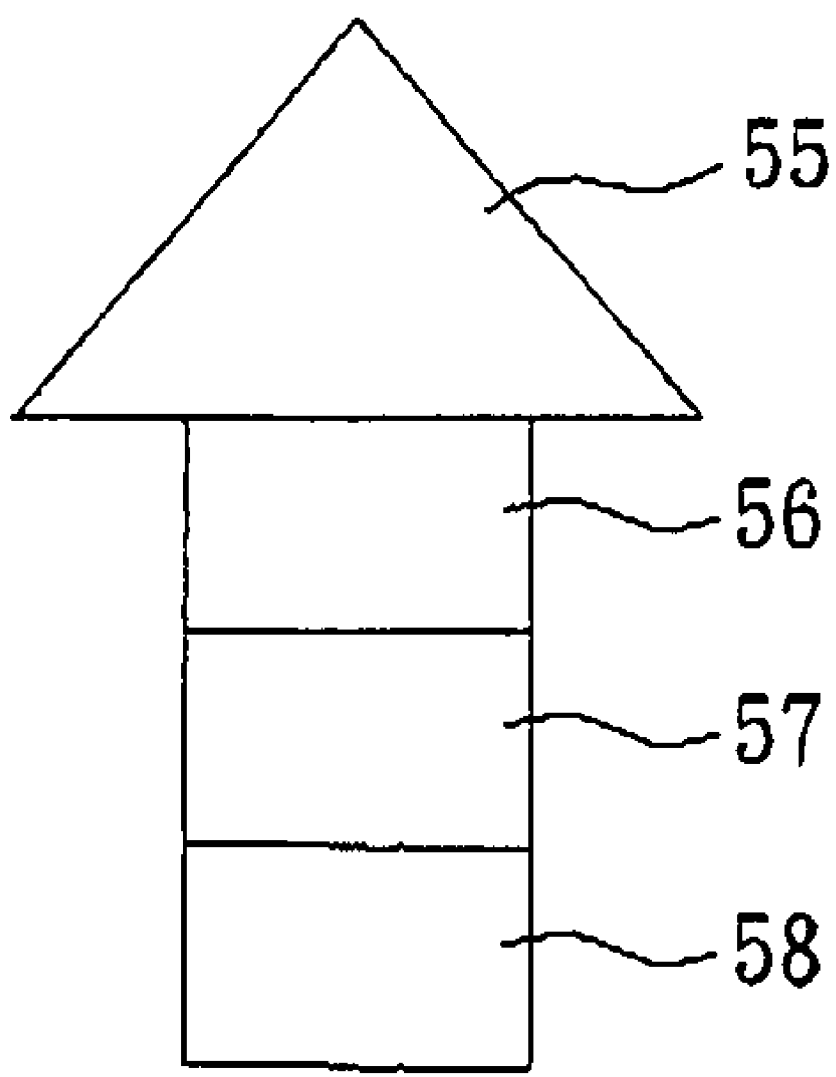
FIG. 5B is a schematic illustration showing an image display embodiment.

In addition to the above-mentioned animation modes defined by the ASM bits 25, the animation display apparatus 60 may also generate the animation effects by switching among color sets according to the value of the SCE bit 27, and the animation effect of switching among the color sets may be used in combination with the animation modes mentioned hereinabove. When the SCE bit 27 is enabled, the CLUT display unit 65 does not determine the used color set according to the value of the color set index bits 28, but generates the animation effect by automatically switching among the selected color sets. For example, FIG. 5A shows four different color sets 51, 52, 53 and 54 loaded by the CLUT display unit 65 in this embodiment, wherein each color set includes, from left to right, first, second, third and fourth color entries respectively corresponding to the four portions 55, 56, 57 and 58 of the arrowhead image of FIG. 5B. It is assumed that the colors 511, 512, 513 and 514 stored in the four color entries of the color sets 51, 52, 53 and 54 are configured as shown in FIG. 5A. When the SCE bit 27 is enabled, the CLUT display unit 65 switches the used color sets in the sequence of 51→52→53→54. Thus, the image as shown in FIG. 5B may be displayed with the specific animation effect.

It is to be noted that the entry configurations of the control register, the operation methods for various animation modes, and the combinations stated in the embodiment of the invention are made for illustration purpose only but not for limiting the scope of the invention.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An animation display apparatus implemented with a dedicated hardware circuit, the animation display apparatus comprising:

a control register for storing a plurality of control bits;
an image memory for storing image data; and
a processing unit, which is coupled to the control register and the image data, for reading the image data stored in the image memory according to the control bits and generating an animation effect,
wherein the animation display apparatus generates the animation effect on a frame-by-frame basis that is synchronized in time with control signals of a coupled video display, such that the generation of the animation effect is synchronized with a coupled display on a frame-by-frame basis.

2. The animation display apparatus according to claim 1, wherein the generation of the animation effect is synchronized with a horizontal sync signal HSYNC and/or a vertical sync signal VSYNC of the coupled display.

3. The animation display apparatus according to claim 1, further comprising a control signal generator, which is coupled to the control register, for generating a control signal, which controls the processing unit, according to the control bits.

4. The animation display apparatus according to claim 1, wherein the processing unit comprises a sequencer for reading the image data stored in the image memory according to the control bits.

5. The animation display apparatus according to claim 4, wherein the sequencer reads the image data stored in the image memory according to a specific sequence.

6. The animation display apparatus according to claim 4, wherein the sequencer reads a plurality of pixels of the image data stored in the image memory according to a specific sequence.

7. The animation display apparatus according to claim 1, wherein the processing unit comprises a CLUT (Color Look-Up Table) display unit for coloring the image data read from the image memory according to a color look-up table.

8. The animation display apparatus according to claim 7, wherein the CLUT display unit switches among a plurality of color sets according to a specific sequence so as to generate the animation effect.

9. The animation display apparatus according to claim 1, wherein the control register receives an instruction from a central processing unit and stores the instruction as the control bits.

10. An animation display method comprising the steps of:
storing a plurality of control bits in a control register;
storing image data in an image memory;
reading the image data stored in the image memory according to the control bits and generating an animation effect on a frame-by-frame basis that is synchronized in time with control signals of a coupled video display, such that the generation of the animation effect is synchronized with a coupled display on a frame-by-frame basis,
wherein the animation display method is being used in a dedicated hardware circuit implemented in an integrated circuit.

11. The method according to claim 10, wherein the step of generating the animation effect is synchronized with horizontal sync signal HSYNC and/or a vertical sync signal VSYNC of a coupled display.

12. The method according to claim 10, wherein the step of generating the animation effect is performed by reading the image data stored in the image memory according to a specific sequence.

13. The method according to claim 10, wherein the step of generating the animation effect is performed by reading a plurality of pixels of the image data stored in the image memory according to a specific sequence.

14. The method according to claim 10, further comprising the step of coloring the image data read from the image memory according to a color look-up table.

15. The method according to claim 14, wherein the step of generating the animation effect is performed by switching among a plurality of color sets according to a specific sequence.

16. The method according to claim 10, further comprising the step of receiving an instruction from a central processing unit and storing the instruction as the control bits.

17. An animation display apparatus, comprising:
a control register, for storing a plurality of control bits;
an image memory, for storing image data; and
a processing unit, coupled to the control register and the image memory, for reading the image data stored in the image memory according to the control bits, and generating an animation effect in timed synchronization with a display sync signal,
wherein the animation display apparatus is implemented with dedicated hardware circuit generating the animation effect on a frame-by-frame basis, corresponding to a displaying performed on a frame-by-frame basis.

18. The animation display apparatus according to claim 17, wherein the control bits animate the image data with a rotation, a horizontal flip and a vertical flip, each with a single bit respectively.

19. The animation display apparatus according to claim 18, wherein a sequence and a combination of the rotation, the horizontal flip and the vertical flip compose the animation effect.

20. The animation display apparatus according to claim 18, further comprising a CLUT (Color Look-Up Table) display unit, wherein the CLUT display unit switches among a plurality of color sets according to a specific sequence so as to generate the animation effect.

* * * * *